(12) United States Patent
Tucker et al.

(10) Patent No.: US 12,258,118 B2
(45) Date of Patent: Mar. 25, 2025

(54) THERMAL PROTECTION SYSTEMS AND METHODS FOR VEHICLES MOVING THROUGH A FREE STREAM OF AIR

(71) Applicant: The Boeing Company, Arlington, VA (US)

(72) Inventors: Andrew R. Tucker, Glendale, MO (US); David Conradi, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 233 days.

(21) Appl. No.: 18/166,079

(22) Filed: Feb. 8, 2023

(65) Prior Publication Data

US 2024/0262487 A1 Aug. 8, 2024

(51) Int. Cl.
| | |
|---|---|
| *B64C 1/40* | (2006.01) |
| *B32B 3/12* | (2006.01) |
| *B32B 3/26* | (2006.01) |
| *B32B 5/18* | (2006.01) |
| *B32B 7/12* | (2006.01) |
| *B32B 15/04* | (2006.01) |

(52) U.S. Cl.
CPC .................. *B64C 1/40* (2013.01); *B32B 3/12* (2013.01); *B32B 3/266* (2013.01); *B32B 5/18* (2013.01); *B32B 7/12* (2013.01); *B32B 15/046* (2013.01); *B32B 2262/105* (2013.01); *B32B 2266/057* (2016.11); *B32B 2266/06* (2013.01); *B32B 2307/304* (2013.01); *B32B 2307/732* (2013.01); *B32B 2605/18* (2013.01)

(58) Field of Classification Search
CPC .. B64C 1/40; B32B 3/12; B32B 3/266; B32B 5/18; B32B 7/12
USPC .......................................................... 165/44
See application file for complete search history.

(56) References Cited

U.S. PATENT DOCUMENTS

| | | | | |
|---|---|---|---|---|
| 4,151,800 A | * | 5/1979 | Dotts ....................... | B64G 1/58 428/920 |
| 5,299,762 A | * | 4/1994 | Kosson .................... | B64G 1/58 244/130 |

(Continued)

OTHER PUBLICATIONS

Greene: "Thermal Protection and Control," *Kennedy Space Center* (2013).

*Primary Examiner* — Jon T. Schermerhorn, Jr.
(74) *Attorney, Agent, or Firm* — Walters & Wasylyna LLC

(57) ABSTRACT

A thermal protection system is provided for a vehicle moving with velocity through a free stream of air. The system comprises a substrate layer having coolant feed holes through which coolant can pass, and an insulation layer bonded to the substrate layer and covering the coolant feed holes of the substrate layer. The system also comprises a honeycomb layer including (i) a first major surface bonded to the insulation layer, (ii) a second major surface opposite the first major surface and exposed to the free stream of air, and (iii) a cell structure that shifts a thermal boundary interface from between the insulation layer and the first major surface of the honeycomb layer to the second major surface of the honeycomb layer. Surface cooling of the insulation layer and the substrate layer is provided by coolant passing through the coolant feed holes of the substrate layer into the insulation layer as the vehicle moves with velocity through the free stream of air.

20 Claims, 5 Drawing Sheets

(56) References Cited

U.S. PATENT DOCUMENTS

| | | | |
|---|---|---|---|
| 7,128,532 B2 * | 10/2006 | Petervary | F02K 9/972 |
| | | | 416/97 R |
| 8,357,258 B2 | 1/2013 | Heng et al. | |
| 10,647,074 B2 | 5/2020 | Frantz et al. | |
| 10,647,081 B2 * | 5/2020 | Hull | B32B 9/005 |
| 11,535,360 B1 * | 12/2022 | Roper | F28F 13/18 |
| 11,866,204 B2 * | 1/2024 | Keune | B64G 1/50 |
| 12,014,714 B2 * | 6/2024 | Porte | B64C 1/40 |
| 12,091,239 B2 * | 9/2024 | Pherson | B32B 3/12 |
| 2004/0245389 A1 * | 12/2004 | Behrens | F28F 13/003 |
| | | | 244/117 A |
| 2010/0038051 A1 | 2/2010 | Behrens et al. | |
| 2024/0043111 A1 * | 2/2024 | Luesutthiviboon | B64C 9/16 |
| 2024/0375394 A1 * | 11/2024 | Kim | B32B 9/04 |

\* cited by examiner

THERMAL PROTECTION SYSTEMS AND METHODS FOR VEHICLES MOVING THROUGH A FREE STREAM OF AIR

FIELD

The present disclosure generally relates to moving vehicles and, more particularly, to a thermal protection system for a vehicle, such as an aircraft, moving through a free stream of air and a method therefor.

BACKGROUND

A vehicle, such as an aircraft, moving through a free stream of air is exposed to a high convective heat flux environment due to heat being generated in aircraft substructures as the aircraft is moving through the air stream. Aircraft substructures impacted in this way would include the outer mold line skin and the inlet and nozzle in the propulsion system flow path.

An aircraft substructure is cooled by transpirational cooling in which a coolant passes through a porous material that covers the aircraft substructure. The transpirational cooling thermally protects the aircraft substructure from the heat generated by the aircraft moving through the free stream of air.

Despite advances already made, those skilled in the art continue to research and develop systems for thermally protecting vehicle substructures including aircraft substructures.

SUMMARY

Disclosed are thermal protection systems for vehicles moving with velocity through a free stream of air.

In one example, the disclosed thermal protection system includes a substrate layer having coolant feed holes through which coolant can pass, and an insulation layer bonded to the substrate layer and covering the coolant feed holes of the substrate layer. The system also includes a honeycomb layer including (i) a first major surface bonded to the insulation layer, (ii) a second major surface opposite the first major surface and exposed to the free stream of air, and (iii) a cell structure that shifts a thermal boundary interface from between the insulation layer and the first major surface of the honeycomb layer to the second major surface of the honeycomb layer such that surface cooling of the insulation layer and the substrate layer is provided by coolant passing through the coolant feed holes of the substrate layer into the insulation layer as the vehicle moves with velocity against the free stream of air.

In another example, the disclosed thermal protection system includes a honeycomb layer having a major surface facing the free stream of air. The system also includes a vehicle panel having coolant feed holes through which coolant can pass. The system further includes an insulation layer sandwiched between the vehicle panel and an opposite major surface of the honeycomb layer such that coolant passing through the coolant feed holes of the vehicle panel can diffuse through both the insulation layer and the honeycomb layer to thermally protect the vehicle panel from heat produced by the vehicle moving with velocity through the free stream of air.

Also disclosed are thermal protection methods for vehicles moving with velocity through a free stream of air.

In one example, the disclosed thermal protection method includes passing coolant through coolant feed holes of a vehicle panel into an insulation layer. The method also includes diffusing coolant from the insulation layer through a honeycomb layer that is disposed between the insulation layer and the free stream of air to support transpirational cooling of the insulation layer and the vehicle panel and thereby to thermally protect the insulation layer and the vehicle panel.

Also disclosed are aerospace panels that are thermally protected.

Other examples of the disclosed thermal protection systems and methods will become apparent from the following detailed description, the accompanying drawings and the appended claims.

DETAILED DESCRIPTION

The present application is directed to a thermal protection system and method for a vehicle moving through a free stream of air. The specific construction of the system and method therefor and the industry in which the system and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes a thermal protection system and method for a vehicle, such as an aircraft, moving through a free stream of air. The system and method may be implemented by an original equipment manufacturer (OEM) in compliance with military and space regulations. It is conceivable that the disclosed system and method may be implemented in many other vehicle-type industries.

Figure 1:
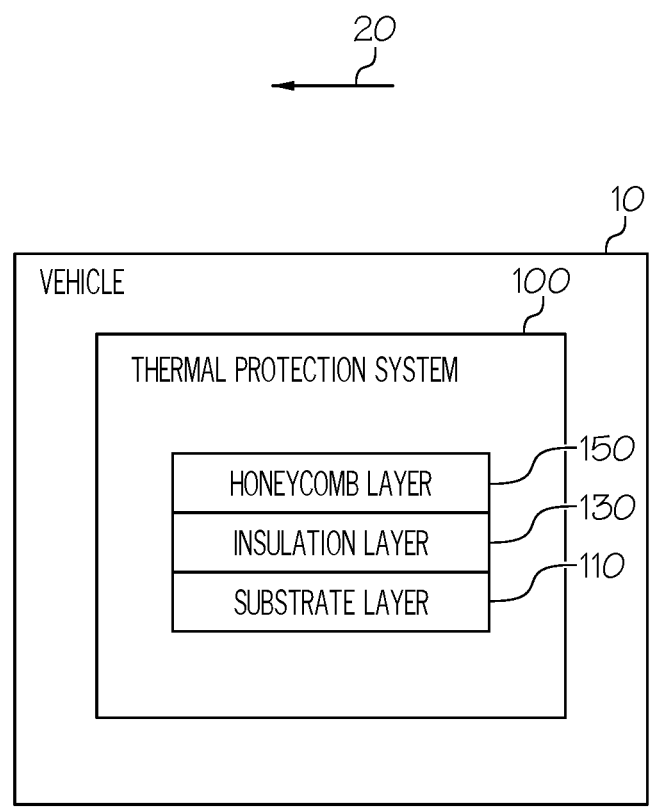
FIG. 1 is a schematic block diagram of a vehicle moving against a free stream of air and embodying a thermal protection system constructed in accordance with an example implementation.

Referring to FIG. 1, a schematic block diagram of a vehicle 10 moving through a free stream of air 20 is illustrated. The vehicle 10 embodies a thermal protection system 100 constructed in accordance with an example implementation. In FIG. 1, the thermal protection system 100 includes a number of different material layers including a substrate layer 110, an insulation layer 130, and a honeycomb layer 150.

Figure 2:
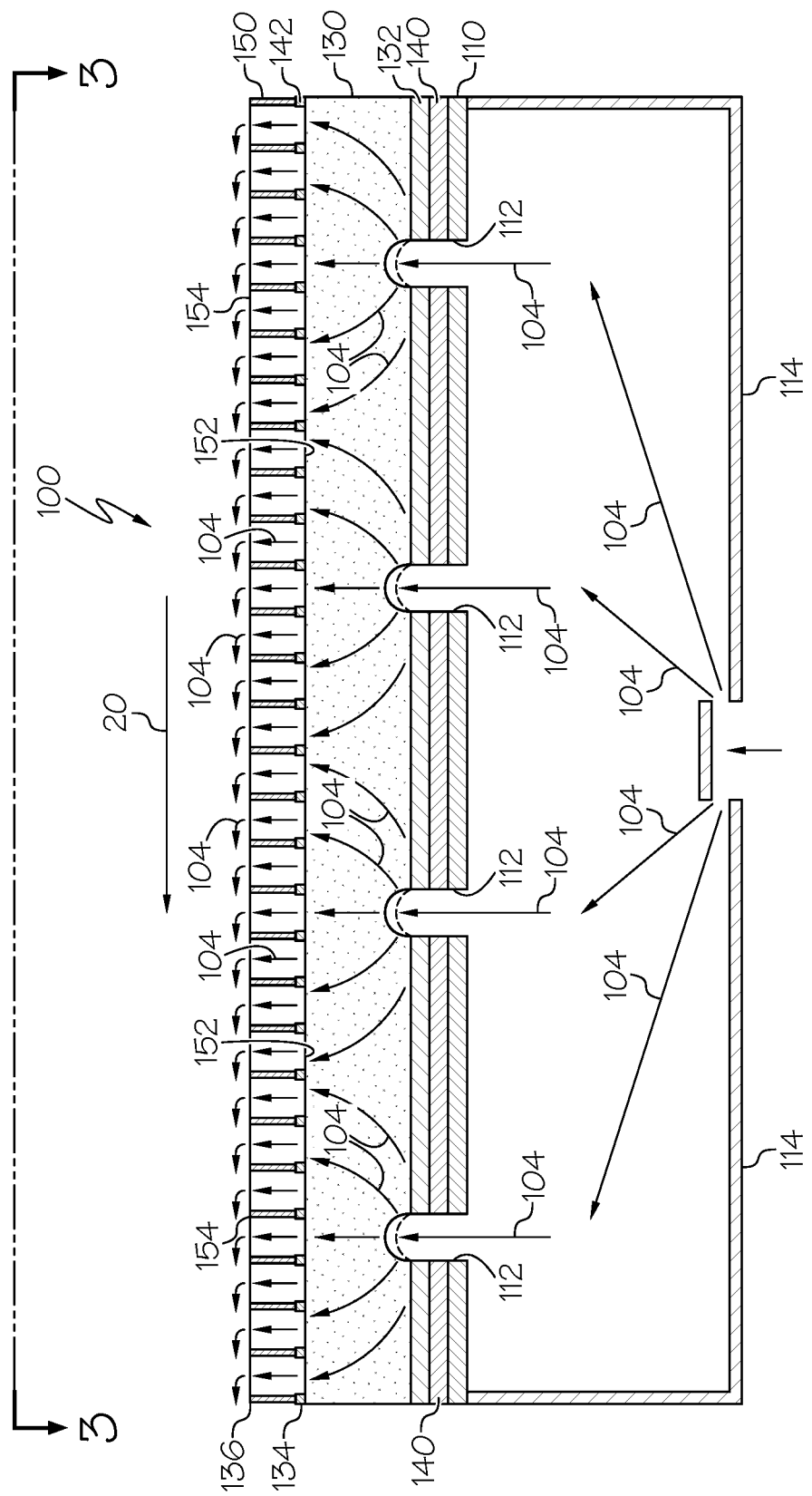
FIG. 2 is a schematic elevational view of a portion of the thermal protection system of FIG. 1, showing layers of the thermal protection system.

Referring to FIG. 2, a schematic elevational view of the thermal protection system 100 of FIG. 1 is illustrated. FIG. 2 shows details of the layers 110, 130, 150 of the thermal protection system 100. The substrate layer 110 may be an aerospace panel, and may include a metallic material (e.g., aluminum) capable of providing sufficient structural rigidity to support the load of the honeycomb layer 150 and the insulation layer 130. A plenum 114 is adjacent to the substrate layer 110. The plenum 114 directs coolant 104, which may be a gas (e.g., air), from a coolant source (not shown) to the coolant feed holes 112 of the substrate layer 110. The substrate layer 110 may have coolant feed holes 112 drilled therethrough. The coolant feed holes 112 may perforate the substrate layer 110 and may project a short distance into the insulation layer 130 (e.g., less than 25% of the total thickness of the insulation layer 130), as shown in FIG. 2. The coolant 104 passes from the plenum 114 through the coolant feed holes 112 and into and through the insulation layer 130.

The insulation layer 130 may be coated with a thin layer (<100 mils) of hardness coat 132 that is applied to increase the adhesion of the porous ceramic foam of the insulation layer 130 to the substrate layer 110. The hardness coat 132 on the insulation layer 130 is bonded (e.g., adhesively) to the substrate layer 110. Bonding material 140 may be a room-temperature vulcanizing silicone adhesive. Other bonding materials are possible. The insulation layer 130 includes an open-cell, hyper-porous, ceramic, foam material. In some implementations, the insulation layer 130 includes ceramic fibers of various diameters and lengths bonded together at random to provide an open cell, hyper-porous foam. Pore size of the open-cell, hyper-porous, ceramic, foam material is less than about 250 microns. Other foam materials and pore sizes are possible. Structure and operation of foam materials are known and conventional and, therefore, will not be described.

The honeycomb layer 150 includes a first major surface 152 bonded at boundary interface 134 to the insulation layer 130, and a second major surface 154 opposite the first major surface 152 and exposed at boundary interface 136 to the free stream of air 20. Bonding material 142 may comprise a room-temperature vulcanizing silicone adhesive. Other bonding materials are possible. The honeycomb layer 150 comprises a phenolic resin with fibers dispersed throughout the phenolic resin. Other materials are possible.

It should be apparent that the insulation layer 130 is sandwiched between the substrate layer 110 and the honeycomb layer 150. As such, coolant 104 passing through the coolant feed holes 112 of the substrate layer 110 can diffuse through both the insulation layer 130 and the honeycomb layer 150 to thermally protect the substrate layer 110 from heat produced by the vehicle 10 moving with velocity through the free stream of air 20.

Figure 3:
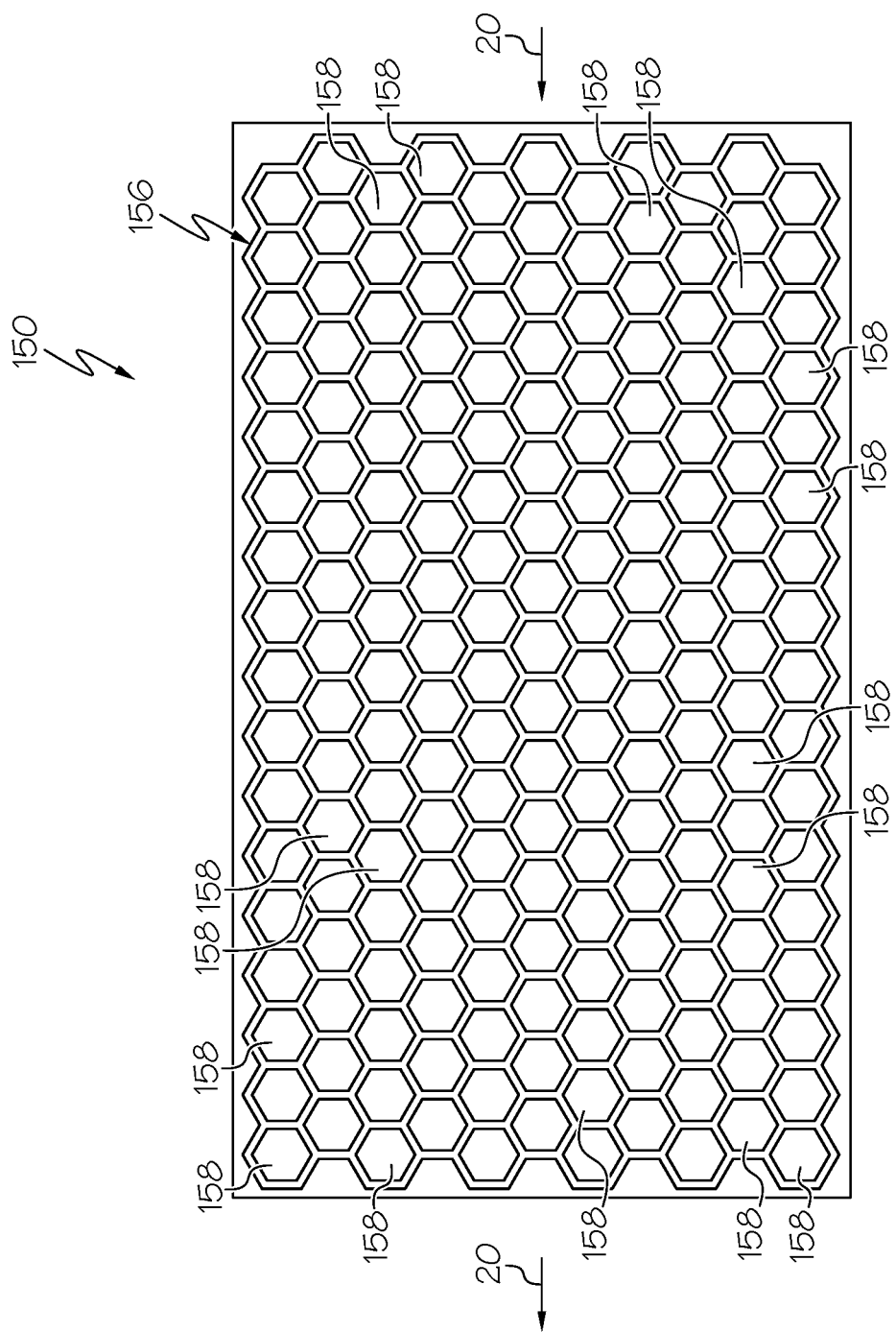
FIG. 3 is a top view, looking approximately along line 3-3 in FIG. 2, and showing arrangement of honeycomb cells of a honeycomb layer of the thermal protection system.

Referring to FIG. 3, a top view, looking approximately along line 3-3 in FIG. 2, is illustrated. FIG. 3 shows arrangement of a honeycomb cell structure 156 of the honeycomb layer 150 of the thermal protection system 100. The honeycomb cell structure 156 comprises a plurality of honeycomb cells 158. Each of the honeycomb cells 158 is hexagonal-shaped, and has a cell size and a cell thickness that are sufficient to block the free stream of air 20 from the insulation layer 130 that is underneath the honeycomb layer 150 in FIG. 3. The cell size of each of the honeycomb cells 158 is about 0.375 inches and the cell thickness of each of the honeycomb layers is about 0.250 inches. Other cell sizes and cell thicknesses are possible.

In accordance with an example of the present disclosure, the presence of the honeycomb cell structure 156 shifts (i.e., offsets) a thermal boundary interface (i.e., the boundary interface 134 that is shown in FIG. 2) from between the insulation layer 130 and the first major surface 152 of the honeycomb layer 150 to the second major surface 154 of the honeycomb layer 150. By shifting a thermal boundary interface from the first major surface 152 to the second major surface 154, surface cooling of the underlying insulation layer 130 and the substrate layer 110 is provided when coolant 104 passes through the coolant feed holes 112 of the substrate layer 110 into the insulation layer 130 as the vehicle 10 moves with velocity through the free stream of air 20. Notably, transpirational cooling of the insulation layer 130 is improved when coolant 104 passes through the substrate layer 110 and into the insulation layer 130 by reducing the amount of coolant 104 needed to maintain temperature of the substrate layer 110 below a predetermined temperature limit.

Figure 4:
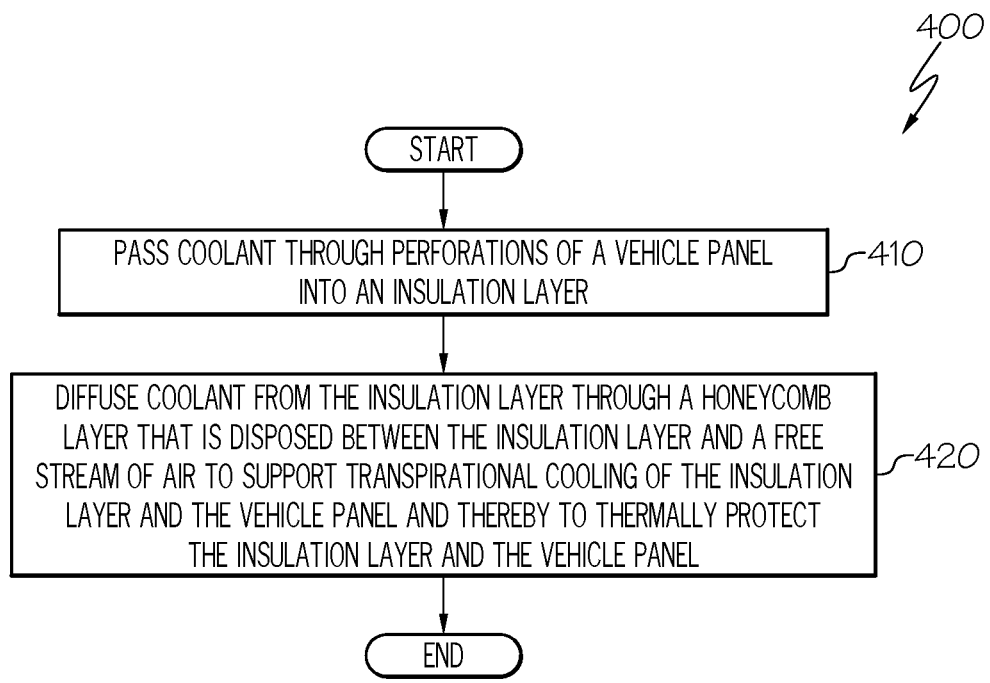
FIG. 4 is a flow diagram depicting a thermal protection method in accordance with an example implementation.

Referring to FIG. 4, a flow diagram 400 of a thermal protection method in accordance with an example implementation is illustrated. The thermal protection method is for a vehicle moving with velocity through a free stream of air. In block 410, coolant is passed through coolant feed holes of a vehicle panel into an insulation layer. The process proceeds to block 420 in which coolant is diffused from the insulation layer through a honeycomb layer that is disposed between the insulation layer and a free stream of air to support transpirational cooling of the insulation layer and the vehicle panel. The transpirational cooling thermally protects the insulation layer and the vehicle panel. The process then ends.

In some embodiments, coolant comprising a gas is passed through the coolant feed holes of the vehicle panel into the insulation layer.

In some embodiments, coolant comprising air is passed through the coolant feed holes of the vehicle panel into the insulation layer.

In some embodiments, coolant from a coolant source is directed through a plenum to the coolant feed holes of the vehicle panel.

In some embodiments, an aerospace panel is thermally protected according to the disclosed thermal protection method.

A number of advantages are provided by the system and method disclosed herein. One advantage is that the honeycomb layer 150 provides free stream blocking (i.e., blocking the stream of air 20 from the underlying insulation layer 130) while allowing transpirational cooling of the insulation layer 130 at the boundary interface 134 between the honeycomb layer 150 and the insulation layer 130 in a high convective heat flux environment.

Another advantage is that the free stream blocking provides surface temperature control at the boundary interface 134 to maintain temperature of the bonding material 142 and temperature of the honeycomb layer 150 below their temperature limits. As an example, the free stream blocking can reduce the amount of coolant 104 (e.g., up to a 50% reduction of coolant flow rate) required to provide thermal protection for a given temperature at the boundary interface 134.

Yet another advantage is that a combination of the vehicle driving range and the vehicle payload capacity for a given vehicle can be increased since the amount of coolant 104 required is reduced. The result is not only a cost savings for the required amount of coolant 104, but also an increased driving range and/or payload capacity for the given vehicle.

Figure 5:
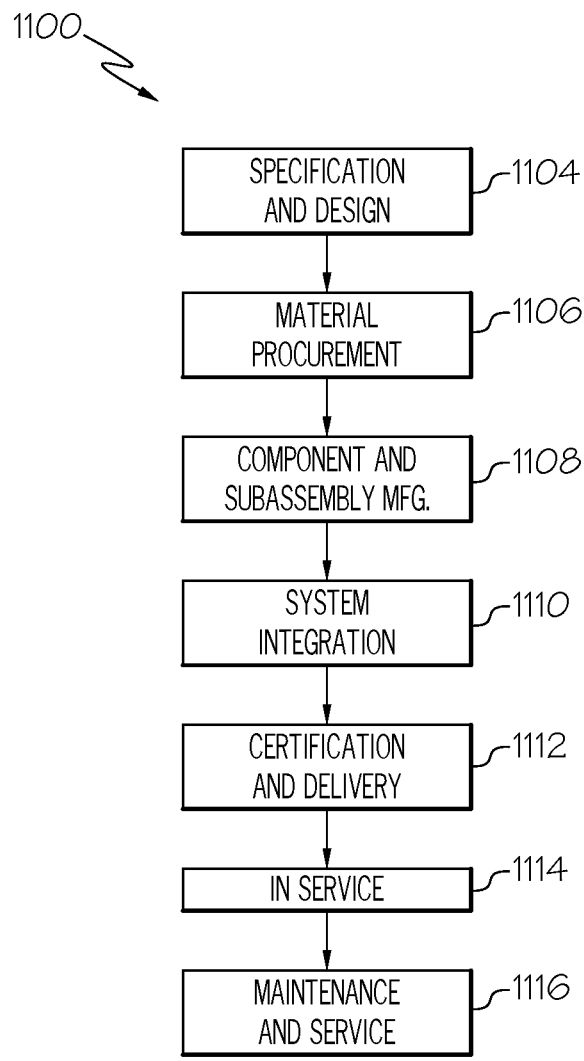
FIG. 5 is a block diagram of aircraft production and service methodology.
Figure 6:
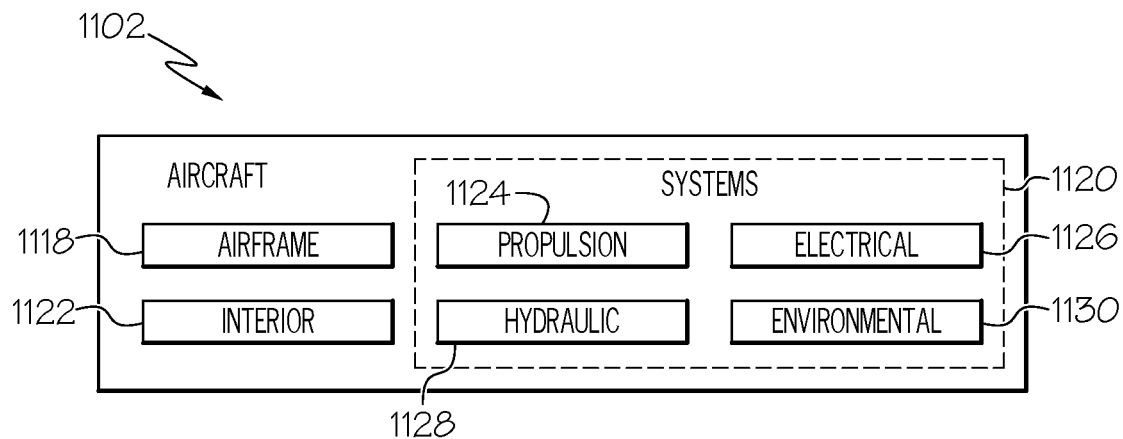
FIG. 6 is a schematic illustration of an aircraft.

Examples of the disclosure may be described in the context of an aircraft manufacturing and service method 1100, as shown in FIG. 5, and an aircraft 1102, as shown in FIG. 6. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 6, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed system and method may be employed during any one or more of the stages of the aircraft manufacturing and service method 1100. As one example, components or subassemblies corresponding to component/subassembly manufacturing 1108, system integration 1110, and/or maintenance and service 1116 may be assembled using the disclosed system and method. As another example, the airframe 1118 may be constructed using the disclosed system and method. Also, one or more system examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more system examples, method examples, or a combination thereof may be utilized while the aircraft 1102 is in service, for example and without limitation, to maintenance and service 1116.

Different examples of the system and method disclosed herein include a variety of components, features, and functionalities. It should be understood that the various examples of the system and method disclosed herein may include any of the components, features, and functionalities of any of the other examples of the system and method disclosed herein in any combination, and all of such possibilities are intended to be within the scope of the present disclosure.

The above-described system and method are described in the context of an aircraft. However, one of ordinary skill in the art will readily recognize that the disclosed system and method are suitable for a variety of applications, and the present disclosure is not limited to aircraft manufacturing applications. For example, the disclosed system and method may be implemented in various types of vehicles including, for example, helicopters, passenger ships, automobiles, marine products (boat, motors, etc.) and the like. Non-vehicle applications are also contemplated.

As an example, the disclosed system and method may be applied to a vehicle outer mold line, or to an internal mold line of inlets and nozzles for missiles or space vehicles, to protect underlying substructures in a high speed, high convective heat flux environment.

Although the above-description describes a system and method for thermally protecting an aerospace part (e.g., an aircraft panel) in the aviation industry in accordance with military and space regulations, it is contemplated that the system and method may be implemented to facilitate for thermally protecting a part in any industry in accordance with the applicable industry standards. The specific system and method can be selected and tailored depending upon the particular application.

Further, although various examples of disclosed embodiments have been shown and described, modifications may occur to those skilled in the art upon reading the specification. The present application includes such modifications and is limited only by the scope of the claims.

What is claimed is:

1. A thermal protection system for a vehicle moving with velocity through a free stream of air, the thermal protection system comprising:
a substrate layer having coolant feed holes through which coolant can pass;
an insulation layer bonded to the substrate layer and covering the coolant feed holes of the substrate layer; and
a honeycomb layer including (i) a first major surface bonded to the insulation layer, (ii) a second major surface opposite the first major surface and exposed to the free stream of air, and (iii) a cell structure that shifts a thermal boundary interface from between the insulation layer and the first major surface of the honeycomb layer to the second major surface of the honeycomb layer such that surface cooling of the insulation layer and the substrate layer is provided by coolant passing through the coolant feed holes of the substrate layer into the insulation layer as the vehicle moves with velocity through the free stream of air.

2. The thermal protection system of claim 1 wherein (i) the cell structure comprises a plurality of honeycomb cells, and (ii) each honeycomb cell has a cell size and a cell thickness that are sufficient to block the free stream of air from the insulation layer and thereby to improve transpirational cooling of the substrate layer and the insulation layer when coolant passes through the substrate layer and the insulation layer by reducing an amount of coolant needed to maintain temperature of the substrate layer below a predetermined temperature limit.

3. The thermal protection system of claim 2 wherein the cell size is about 0.375 inches and the cell thickness is about 0.250 inches.

4. The thermal protection system of claim 1 wherein the insulation layer comprises an open-cell, hyper-porous, ceramic, foam material.

5. The thermal protection system of claim 1 wherein the substrate layer comprises a metallic material capable of providing sufficient structural rigidity to support a load of the honeycomb layer and the insulation layer.

6. The thermal protection system of claim 1 further comprising:
a plenum adjacent to the substrate layer and for directing coolant from a coolant source to the coolant feed holes of the substrate layer.

7. A thermal protection system for a vehicle moving with velocity through a free stream of air, the thermal protection system comprising:
a honeycomb layer having a major surface facing the free stream of air;
a vehicle panel having coolant feed holes through which coolant can pass; and
an insulation layer sandwiched between the vehicle panel and an opposite major surface of the honeycomb layer such that coolant passing through the coolant feed holes of the vehicle panel can diffuse through both the insulation layer and the honeycomb layer to thermally protect the vehicle panel from heat produced by the vehicle moving with velocity against the free stream of air.

8. The thermal protection system of claim 7 wherein (i) the honeycomb layer comprises a plurality of honeycomb cells, and (ii) each honeycomb cell has a cell size about 0.375 inches and a cell thickness about 0.250 inches.

9. The thermal protection system of claim 7 wherein the insulation layer comprises an open-cell, hyper-porous ceramic, foam material.

10. The thermal protection system of claim 9 wherein pore size of the open-cell, hyper-porous, ceramic, foam material is less than about 250 microns.

11. The thermal protection system of claim 7 wherein the insulation layer is adhesively bonded, between the vehicle panel and the honeycomb layer.

12. The thermal protection system of claim 11 wherein the insulation layer comprises ceramic fibers of various diameters and lengths bonded together at random to provide an open cell, hyper-porous foam.

13. The thermal protection system of claim 11 wherein the honeycomb layer comprises a phenolic resin with fibers dispersed throughout the phenolic resin.

14. The thermal protection system of claim 7 wherein the vehicle panel comprises a metallic material capable of providing sufficient structural rigidity to support a load of the honeycomb layer and the insulation layer.

15. The thermal protection system of claim 7 further comprising:

a plenum adjacent to the vehicle panel and for directing coolant from a coolant source to the coolant feed holes of the vehicle panel.

16. A thermal protection method for a vehicle moving with velocity through a free stream of air, the thermal protection method comprising:

passing coolant through coolant feed holes of a vehicle panel into an insulation layer; and diffusing coolant from the insulation layer through a honeycomb layer that is disposed between the insulation layer and the free stream of air to support transpirational cooling of the insulation layer and the vehicle panel and thereby to thermally protect the insulation layer and the vehicle panel.

17. The thermal protection method of claim 16 wherein passing coolant through coolant feed holes of a vehicle panel into an insulation layer includes:

passing coolant comprising a gas through the coolant feed holes of the vehicle panel into the insulation layer.

18. The thermal protection method of claim 16 wherein passing coolant through coolant feed holes of a vehicle panel into an insulation layer includes:

passing coolant comprising air through the coolant feed holes of the vehicle panel into the insulation layer.

19. The thermal protection method of claim 16 further comprising:

directing coolant from a coolant source through a plenum to the coolant feed holes of the vehicle panel.

20. An aerospace panel that is thermally protected according to the thermal protection method of claim 16.

* * * * *